United States Patent
Music et al.

(10) Patent No.: US 7,418,941 B2
(45) Date of Patent: Sep. 2, 2008

(54) FUEL INJECTION APPARATUS

(75) Inventors: Vesna Music, London (GB); Jason P. Frankl, Brighton East (AU); Anthony W Potter, High Wycombe (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/975,233

(22) Filed: Oct. 18, 2007

(65) Prior Publication Data

US 2008/0103677 A1 May 1, 2008

(30) Foreign Application Priority Data

Oct. 31, 2006 (GB) .................................. 0621742.6

(51) Int. Cl.
*F02B 3/00* (2006.01)
*F02B 3/12* (2006.01)

(52) U.S. Cl. ....................... 123/299; 123/478
(58) Field of Classification Search ................. 123/299, 123/456, 447, 446, 457, 458, 459, 506, 478
See application file for complete search history.

(56) References Cited

U.S. PATENT DOCUMENTS

| | | | | |
|---|---|---|---|---|
| 6,840,224 | B2* | 1/2005 | Tanabe et al. | 123/458 |
| 6,843,053 | B2* | 1/2005 | Draper et al. | 60/274 |
| 7,047,941 | B2* | 5/2006 | Draper et al. | 123/447 |
| 7,143,746 | B2* | 12/2006 | Knight et al. | 123/447 |
| 2002/0195081 | A1 | 12/2002 | McGee et al. | |
| 2006/0090735 | A1* | 5/2006 | La Rosa et al. | 123/446 |
| 2006/0150954 | A1* | 7/2006 | Moore | 123/446 |

FOREIGN PATENT DOCUMENTS

| | | | |
|---|---|---|---|
| EP | 0655551 A3 | 5/1995 | |
| EP | 1389680 A2 | 2/2004 | |
| WO | WO2004/055351 A1 | 7/2004 | |

* cited by examiner

*Primary Examiner*—Mahmoud Gimie
(74) *Attorney, Agent, or Firm*—David P. Wood

(57) ABSTRACT

A fuel injection apparatus comprising a fuel injection arrangement for delivering a fuel injection pulse sequence to a combustion chamber during a combustion cycle, the fuel injection pulse sequence comprising a plurality of discrete fuel injection pulses, each discrete fuel injection pulse having a fuel injection pulse type (for example: disabled, common rail pressure, pump pressure etc); a calculation module for monitoring a plurality of vehicle operating parameters, calculating a fuel injection mode in response thereto, and determining a fuel injection mode identifier; a controller arranged to receive the fuel injection mode identifier from the calculation module and operate the fuel injection arrangement in response thereto; wherein the fuel injection mode identifier (for example, a hexadecimal representation in the form of a data string) comprises a plurality of markers, each of the plurality of markers having an ordinal number and a value, wherein the ordinal number of each marker is indicative of the sequential position of an associated one of the plurality of the discrete fuel injection pulses within the fuel injection pulse sequence, and the value of each marker is indicative of the fuel injection type of said associated one of the plurality of discrete fuel injection pulses.

13 Claims, 4 Drawing Sheets

FUEL INJECTION APPARATUS

TECHNICAL FIELD

The invention relates to a fuel injection apparatus and, more particularly, a fuel injection apparatus that includes a fuel injector arrangement operable in one of a plurality of fuel injection modes.

BACKGROUND OF THE INVENTION

Environmental legislation demands constant improvements in the cleanliness of engine exhaust emissions. This has encouraged technological development in many aspects of engine design. One way in which exhaust emissions are improved is to increase combustion efficiency by providing a fuel injector that is able to inject an injection pulse sequence comprising a pattern of discrete injection pulses during each combustion cycle. For example, a fuel injector may be required to deliver a relatively small volume of fuel in one or more so-called 'pilot' injections, followed by a larger delivery of fuel in a main injection event, followed by a relatively small delivery of fuel in one or more so-called 'post' injections.

A particularly advantageous system having the above functionality is a so-called 'hybrid' fuel injection system that combines known common rail technology and known "unit-injector technology".

Referring to FIG. 1, a hybrid fuel injection apparatus 2 includes a pumping arrangement 4 that is arranged to receive fuel from a fuel supply means via a pump supply passage 8 and to supply pressurised fuel to a fuel injector arrangement 10 via an injector supply passage 12.

The pumping arrangement 4 includes a reciprocable pumping plunger 14, an end of which is slidably received within a pumping chamber 16. The pumping plunger 14 is driven by a cam drive arrangement (not shown on FIG. 1) to perform an outward stroke during which fuel enters the pumping chamber 16 from the pump supply passage 8 and an inward stroke during which the pumping plunger 14 moves inwardly to reduce the volume of the pumping chamber 16 thus increasing the pressure of the fuel trapped within it.

The pumping chamber 16 receives fuel via the pump supply passage 8 from one of two sources: i) a high pressure accumulator volume 20, or 'common rail', and ii) a low pressure transfer pump 22. Communication between the low pressure transfer pump 22 and the pump supply passage 8 is controlled via a pressure operable non-return valve 24 and communication between the common rail 20 and the pump supply passage 8 is controlled via an electrically operable two-way valve 26, hereafter 'rail control valve'. The position of the rail control valve 26 determines whether the pumping chamber is supplied with fuel from the common rail 20 or the low pressure transfer pump 22.

The fuel injector arrangement comprises an injector nozzle body 30 defining a bore 32 within which a valve needle 34 is slidable. The nozzle body bore 30 is shaped to define an annular delivery chamber 36 surrounding approximately the mid point of the valve needle 34 and which communicates with the injector supply passage 12.

The valve needle 34 is shaped so as to define a relatively wide upper region 34a that tapers sharply approximately mid-way along the length of the valve needle 34 into a relatively narrow lower region 34b that terminates in a valve tip 34c. The valve needle tip 34c is enagageable with a valve seat 38 so as to open or close a nozzle outlet 40 and thus control the delivery of fuel from the injector arrangement 10. It should be mentioned at this point that although FIG. 1 shows a single nozzle outlet 40, this is for simplicity only and, in practice, such an injection nozzle is likely to include a plurality of nozzle outlets radially disposed about the tip of the nozzle.

The tapered region between the upper region 34a and the lower region 34b defines a thrust surface against which pressurised fuel acts to impart an opening force to the valve needle 34.

The lower region 34b of the valve needle 34 defines a clearance with the bore 32 such that pressurised fuel can flow from the delivery chamber 36, to the nozzle outlet 40 past the valve needle 34. The upper region 34a of the valve needle 34 defines a close sliding fit with the bore 32 so as to provide guidance to the valve needle 34.

The end of the valve needle 34 distal from the valve needle tip 34c includes a surface that is exposed to pressure within a control chamber 42. The pressure of fuel within the control chamber 42 is determined by the state of a three-way, two-position valve 50, hereafter the 'nozzle control valve'. When the nozzle control valve 50 is in a first (closed) position, the control chamber 42 communicates with high pressure fuel within the injector supply passage 12. The high pressure within the control chamber 42 exerts a closing force on the valve needle 34 such that it remains engaged with the valve seat 38, thus preventing fuel delivery through the nozzle outlet 40. The control chamber 42 houses a biasing spring 43 that provides an additional closing force on the valve needle 34.

When the nozzle control valve 50 is in a second (open) position, the control chamber 42 communicates with a low pressure drain passage 52. In this position, the closing force on the valve needle 34 is reduced such that the force due to the fuel pressure within the delivery chamber 36 acting on the valve needle thrust surface is greater than the closing force. As a result, the valve needle 34 is urged away from the valve seat 38 so that fuel delivery is initiated.

One particularly beneficial aspect of the hybrid fuel injection system exemplified in FIG. 1 is that the injection arrangement 10 may be supplied with pressurised fuel for injection from either the pumping arrangement 4, at a relatively high pressure level, or from the common rail 20 at an intermediate pressure level, thus providing the flexibility to vary the pressure of fuel delivered to the combustion chamber.

In order to inject fuel at common rail pressure, the rail control valve 26 is set to its open position. Fuel at common rail pressure therefore flows from the common rail 20, though the pump supply passage 8, the pumping chamber 16 and the injector supply passage 12, to the injector arrangement 10. Opening the nozzle control valve 50 relieves pressure within the control chamber 42 such that the valve needle 34 is urged to lift from the valve seat 38 and so fuel injection is initiated. Closing the nozzle control valve 50 causes pressure to be re-established in the control chamber 42, thus urging the valve needle 34 to re-engage the valve seat 38.

In order to inject fuel at maximum pumping pressure, the rail control valve 26 is set to the closed position. As the pumping plunger 14 performs an outward stroke, pressure in the pumping chamber 16 reduces to a point at which the non-return valve 24 opens due to the pressure difference across it such that fuel at transfer pressure will flow from the transfer pump 22 to the pumping chamber 16. As the pumping plunger 14 begins its inward (pumping) stroke, the pressure of fuel rises so as to close the non-return valve 24 thus preventing pressurised fuel from flowing back to low pressure. High pressure fuel is therefore transmitted to the injector arrangement 10.

A high pumping pressure injection is initiated by opening the nozzle control valve 50 as the pumping plunger 14 approaches its innermost position (i.e. during a pumping stroke). Opening the nozzle control valve 50 relieves the pressure of fuel within the control chamber 42 which permits the valve needle 34 to lift from the valve seat 38, thus initiating an injection event.

As will be appreciated from the above description, the hybrid fuel injection system 2 provides considerable flexibility of injection timing and injection pressure. The availability of a substantially constant pressure fuel source from the common rail 20 permits injection events to be performed at any point in a combustion cycle. Moreover, the pumping arrangement 4 permits one or more high pressure injections of fuel driven from the pumping plunger 14 for a limited duration of the combustion cycle.

The fuel injection system in FIG. 1 is able to inject a sequence of several fuel injection pulses within a combustion cycle. FIG. 2 shows one such sequence comprising six fuel injection pulses: first and second pilot pulses 60, 62, first and second main injection pulses 64, 66, which are shown merged in FIG. 2, and first and second post injection pulses 68, 69.

Each fuel injection pulse in the sequence in FIG. 2 may take one of the following injection pulse types:
i) the fuel injection pulse is disabled,
ii) the fuel injection pulse is at common rail pressure,
iii) the fuel injection pulse is at pump pressure,
iv) the fuel injection pulse is at pump pressure and terminated by pressure spill,
v) the fuel injection pulse is at common rail pressure in HCCI mode (homogeneous charge compression ignition). In common rail HCCI mode, the fuel injection pulse is spilt into several small injections so as to achieve a greater degree of homogeneity of the fuel/air charge within the combustion chamber.

The number and type of fuel injection pulses making up a specific fuel injection pulse sequence are defined by the term 'fuel injection mode', the precise configuration of which is determined as contributing to efficient combustion conditions at a given engine operating region. For example, pilot fuel injection pulses are often utilised to reduce noise/vibrations at engine idle as they help to ensure a homogenous fuel/air mixture injection thus promoting an evenly distributed flame front around the combustion chamber. Furthermore, permitting two instances of main injection pulses is usually used at low speed when pump pressure cannot be maintained during a long main injection pulse. Therefore, by splitting the main injection and allowing pressure to build up in between for a short time, it is possible to have a longer injection at an higher average pressure. Post injection pulses typically are used for regenerating particulate filters installed within the exhaust system.

Referring again to FIG. 1, the fuel injection apparatus 2 is controlled by an engine control unit (ECU) 70 which has overall responsibility for the correct operation of all aspects of the engine and, in particular, is operable to control the injection arrangement 10 to operate in one of a plurality of fuel injection modes, depending on the prevailing operating condition of the engine.

The engine control unit 70 includes a fuel injection mode module 72, hereafter 'FIM module', which monitors a variety of engine parameters 74 (for example, engine speed, engine load, outside air temperature, accelerator pedal position) and calculates the appropriate fuel injection mode that suits the prevailing operating conditions of the engine.

In the known fuel injection apparatus 2 of FIG. 1, all possible fuel injection modes that are suitable for use with the fuel injection apparatus 2 are predefined during manufacture and a unique identifier in the form of a real number is allocated, in sequence, to each fuel injection mode. The FIM module 72 calculates the appropriate fuel injection mode in response to the prevailing operating condition of the engine and outputs the appropriate fuel injection mode identifier to a fuel injection equipment control module 76, hereafter 'FIE control module', which is responsible for controlling the nozzle control valve 50 and rail control valve 26.

The FIE control module 76 receives the fuel injection mode identifier as an input and configures injection characteristics for the injection pulse sequence, such as the volume of fuel to deliver during each discrete injection pulse within the pulse sequence, the timing of the injection pulse sequence within the combustion cycle and the temporal separation between the discrete injection pulses within the pulse sequence. The FIE control module 76 outputs first and second electrical control signals 80, 82 to the nozzle control valve 50 and the rail control valve 26, respectively, in order to control their operation and, thus, control the fuel injection apparatus 2.

In order to configure the appropriate settings for the injection pulse sequence, the FIE control module 76 uses the fuel injection mode identifier to reference a look up table 78 that is stored as a globally accessible data structure within the FIE control module 76.

The FIE control module 76 communicates with the look up table 78 by way of a data link 84, retrieves the injector pulse sequence that corresponds to the identifier that the FIE control module 76 received from the FIM module 72 and uses the injection pulse sequence data during subsequent calculations of the injection characteristics.

This above process repeats at a frequency of approximately 50 to 100 Hz whilst the engine is in operation in order to readily adapt to the changing operating condition of the engine.

The above described apparatus is disadvantageous in certain respects. Firstly, the operation of the FIE control module 76 as described above imposes a burden on the processing capacity of the engine control unit 70. Secondly, a significant memory resource of the ECU 70 is given over to the storage of the injection pulse sequences. Thirdly, it is problematic for engineers to perform system testing due to necessity to refer to look up tables in order to configure the fuel injection modes in test routines.

The inventors have devised a fuel injection apparatus that modifies the way in which the fuel injection mode is defined which reduces the processing requirement of the engine control unit since it can be manipulated more readily by software functions therein, and which may be interpreted by engineers intuitively without the need to reference data tables during system configuration and calibration.

SUMMARY OF THE INVENTION

It is against this background that the invention provides a fuel injection apparatus comprising a fuel injection arrangement for delivering a fuel injection pulse sequence to a combustion chamber during a combustion cycle, the fuel injection pulse sequence comprising a plurality of discrete fuel injection pulses, each discrete fuel injection pulse having a fuel injection pulse type (for example: disabled, common rail pressure, pump pressure etc); monitoring means for monitoring a plurality of vehicle operating parameters, calculating a fuel injection mode in response thereto, and determining a fuel injection mode identifier; control means arranged to receive the fuel injection mode identifier from the monitoring means and operate the fuel injection arrangement in response thereto; wherein the fuel injection mode identifier (for example, a hexadecimal representation in the form of a data string) comprises a plurality of markers, each of the plurality of markers having an ordinal number (i.e. position in the sequence) and a value, wherein the ordinal number of each marker is indicative of the sequential position of an associated one of the plurality of the discrete fuel injection pulses within the fuel injection pulse sequence, and the value of each marker is indicative of the fuel injection type of said associated one of the plurality of discrete fuel injection pulses.

An advantage of the invention is that a reduction in processor loading in achievable when compared with known fuel injection apparatus since the requirement for the engine control unit to refer to one or more look up tables to interpret a fuel injection mode identifier is avoided. Moreover, memory requirement is reduced since there is no need to store a large number of predefined fuel injection modes in the internal memory of the engine control unit in the form of look up tables.

An additional advantage of the invention is provided to development personnel involved with the design and test of the fuel injection apparatus on an engine. Since the fuel injection mode used by the fuel injection apparatus of the invention may be interpreted more readily by development personnel, the development process less burdensome.

In one embodiment, the fuel injection mode identifier comprises a hexadecimal string which is convenient for processing by the engine control unit.

The plurality of discrete fuel injection pulses may include one or more pilot injection pulses, one or more main injection pulses and one or more post injection pulses. Moreover, each of the plurality of fuel injection pulse types associated with the discrete fuel injection pulses may be indicative of a different fuel injection metering method and, for example, may include selected ones from the group of i) disabled injection pulse, ii) common rail fuel pressure injection pulse iii) unit pump fuel pressure injection pulse iv) unit pump fuel pressure with spill end injection pulse v) common rail pressure HCCI injection pulse.

In one embodiment, the common rail pressure HCCI injection pulse includes a plurality of sub-pulses.

Although the invention is applicable to other forms of fuel injection apparatus, in one embodiment the apparatus is a hybrid fuel injection system including a unit pump arrangement configured to supply pressurised fuel at a first injectable pressure level to a fuel injector and to a fuel accumulator volume and which pump arrangement is adapted to increase the pressure of fuel from the first injectable pressure level to a second, increased pressure level, for supply to the fuel injector.

From another aspect, the invention relates to a method of encoding a fuel injection mode in a fuel injection apparatus as described above, as defined by the appended claims.

It should be appreciated that alternative and/or optional features of the first aspect of the invention may be combined with alternative/optional features of the first aspect of the invention, and vice versa.

BRIEF DESCRIPTION OF THE DRAWINGS

Reference has already been made to FIGS. 1 and 2 which show a known hybrid fuel injection apparatus, and an exemplary form of a fuel injection pulse sequence. In order that it may more readily be understood, the invention will now be described with reference to the following drawings, in which.

DETAILED DESCRIPTION OF EMBODIMENTS OF THE INVENTION

Figure 1:
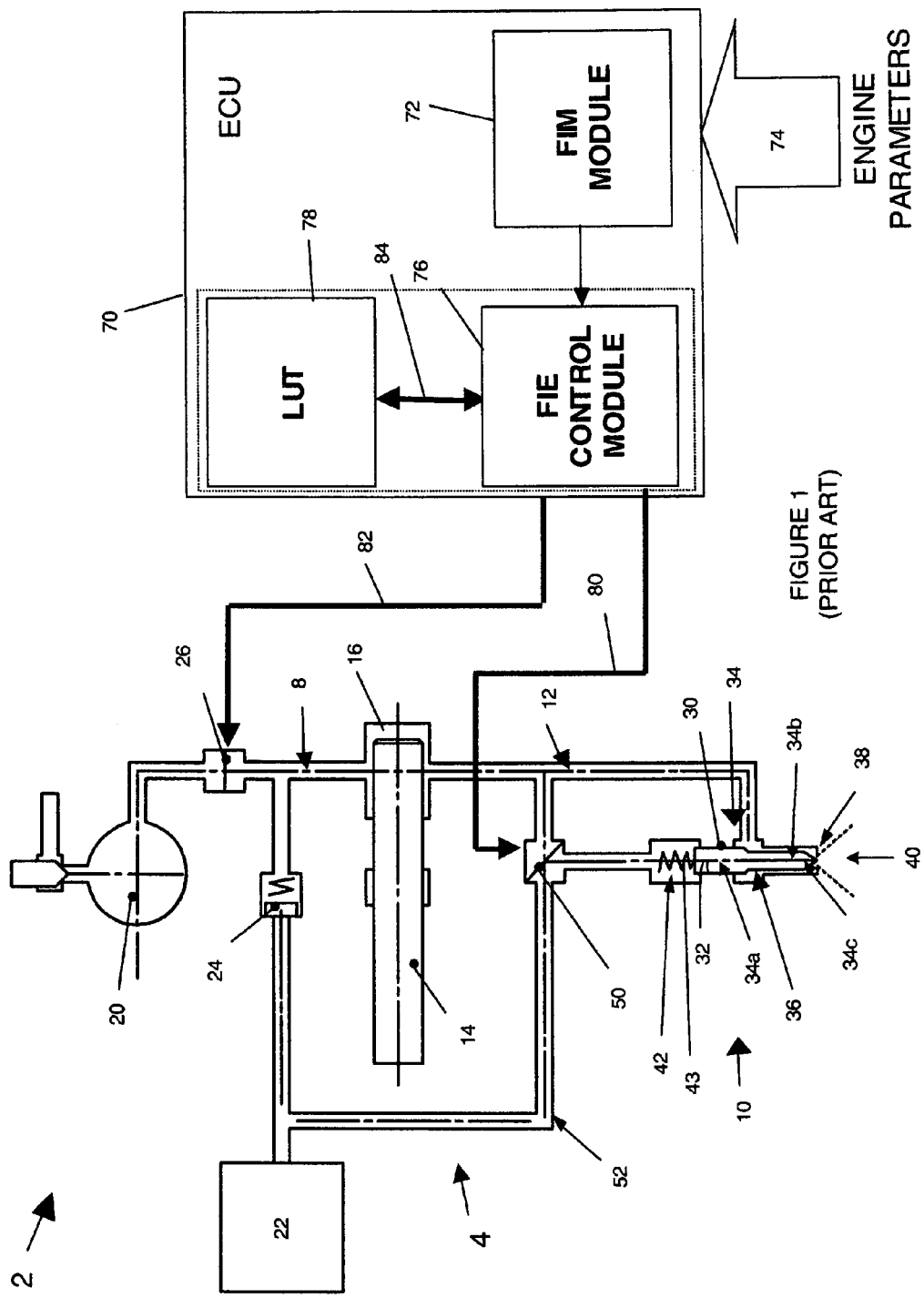
Figure 3:
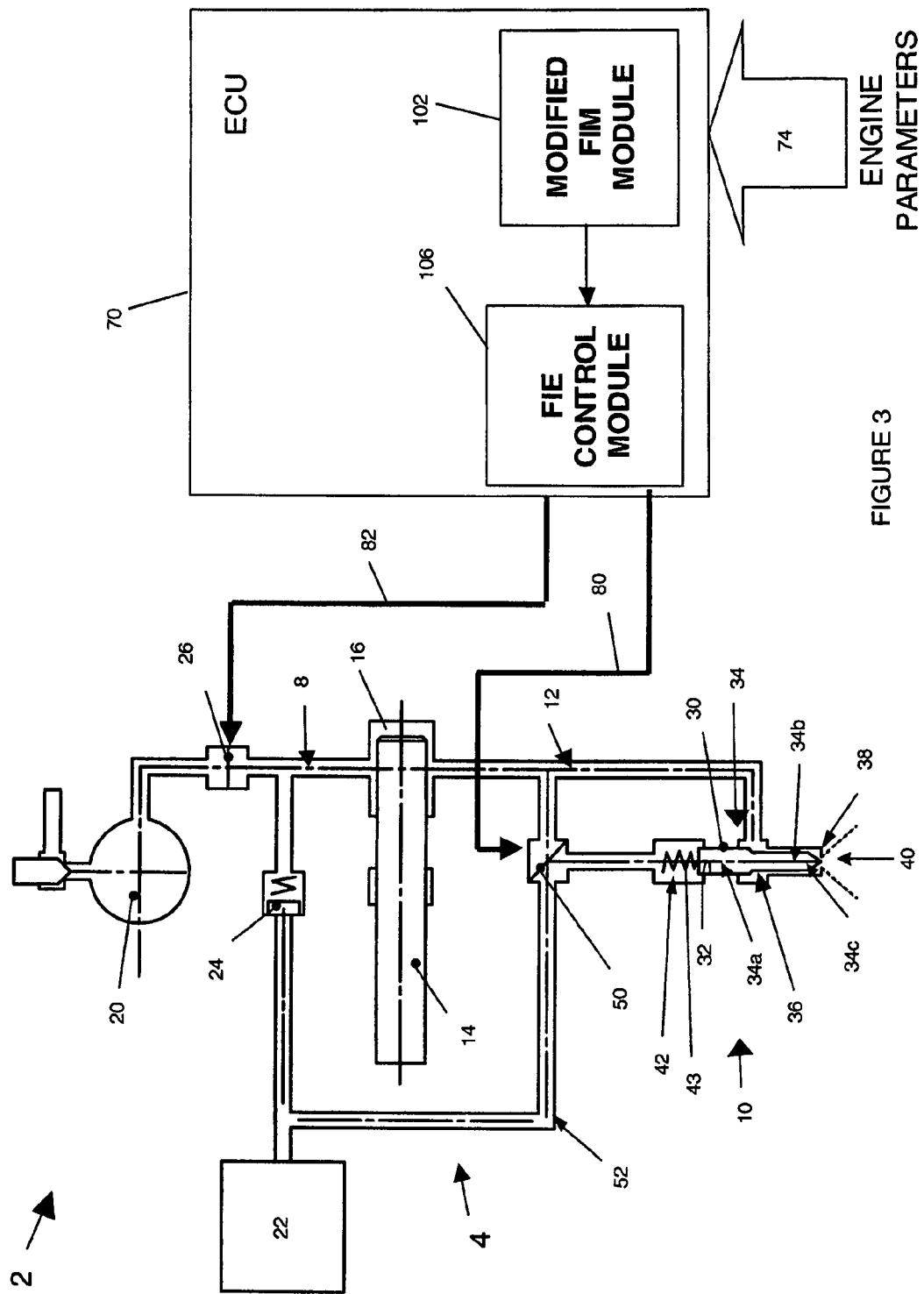
FIG. 3 shows a fuel injection apparatus in accordance with an embodiment of the invention.

FIG. 3 refers to a fuel injection apparatus 2 of the invention that is substantially the same as that described in FIG. 1 apart from a modified FIM module 102. Therefore, the description relating to the apparatus of FIG. 1 also applies to the embodiment of the invention, only the differences being described in further detail hereafter.

In the known fuel injection apparatus 2 described above with reference to FIG. 1, the plurality of fuel injection modes are each allocated a sequential unique fuel injection mode identifier each of which is stored within the FIM module 76. In order to interpret the unique fuel injection mode identifier, the FIE control module 76 must cross reference the unique identifier input to it by the FIM module 72 with the look up table 78 that contains the data relating to a specific fuel injection mode corresponding to the unique identifier.

However, in the embodiment of the invention each of the six fuel injection pulses in the fuel injection pulse sequence are encoded by allocating each individual fuel injection pulse type a specific number code that is indicative of the type of injection that the pulse is to perform; that is to say the particular fuel injection metering method that is to be used, for example whether fuel is injected at common rail pressure, at unit pump pressure or whether the injection is disabled.

By way of explanation, table 1 below lists a series of five fuel injection pulse types and each of their respective number codes:

TABLE 1

| Fuel injection pulse type | Number code (hex) |
| --- | --- |
| fuel injection pulse is disabled | 0 |
| fuel injection pulse is at common rail pressure | 1 |
| fuel injection pulse is at pump pressure | 2 |
| fuel injection pulse is at pump pressure and terminated by pressure spill | 3 |
| fuel injection pulse may occur at common rail pressure in HCCI mode | 4 |

In the invention, for each pulse in the fuel injection pulse sequence, the individual number codes are combined to provide a hexadecimal fuel injection mode identifier.

Figure 2:
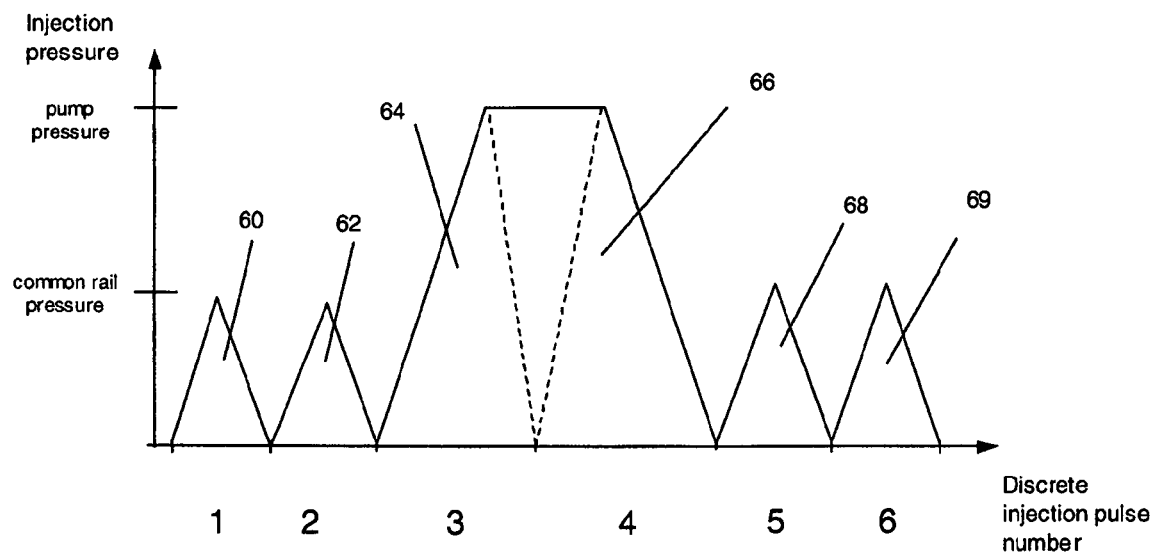
Figure 4:
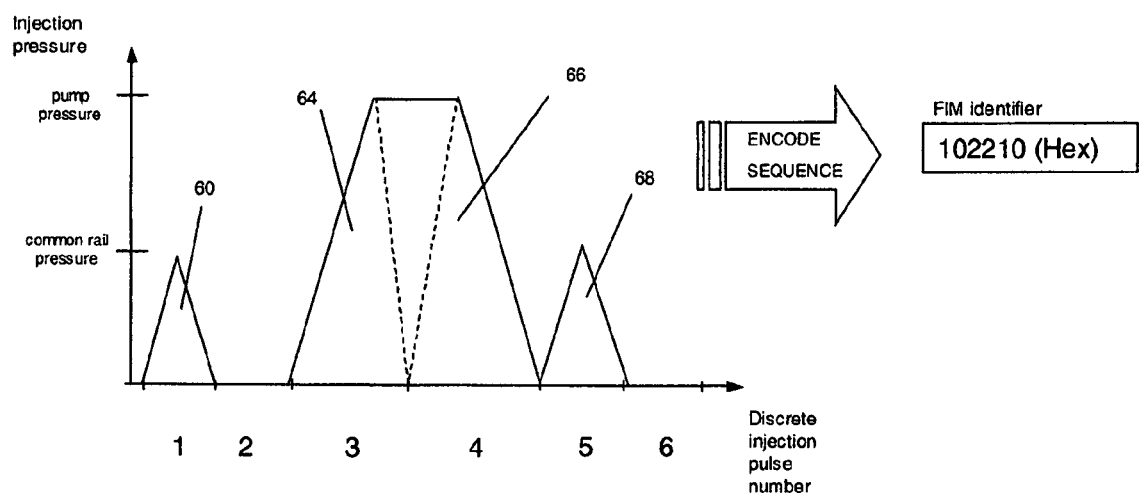
FIG. 4 is an example of a fuel injection pulse sequence and its corresponding unique fuel injection mode identifier, as determined by the fuel injection apparatus of the invention.

By way of example, FIG. 4 shows a fuel injection pulse sequence similar to the exemplary fuel injection pulse sequence in FIG. 2, but comprising the following discrete fuel injection pulses:

First pilot fuel injection pulse 60=common rail (1)
Second pilot injection pulse 62=disabled (0)
First main injection pulse 64=pump (2)
Second main injection pulse 66=pump (2)
First post injection pulse 68=common rail (1)
Second post injection pulse 69=disabled (0)

The fuel injection pulse sequence is therefore encoded as a hexadecimal FIM identifier of $102210_{16}$. Each digit in the FIM identifier has an ordinal number that is representative of the sequential position of an associated discrete fuel injection pulse within the pulse sequence. Each digit can therefore be considered to be a 'marker' of a specific discrete fuel injection pulse. Also, each marker of the identifier has a value (the number code) that is indicative of the fuel injection pulse type of an associated one of the discrete fuel injection pulses.

For example, referring to the FIM identifier $102210_{16}$, the first and second digits in the string indicate the position of the first and second pilot fuel injection pulses, respectively. Their ordinal number is therefore 'one' and 'two', respectively. Furthermore, the number code allocated at the first digit is '1' which is indicative of the first pilot fuel injection pulse taking place at common rail fuel pressure, whereas the number code allocated to the second digit is '0' which is indicative of the second fuel injection pulse being disabled.

All possible combinations of fuel injection pulse sequences are stored in the modified FIM module 102 which outputs the FIM identifier to the FIE control module 106. The FIE control module 106 is arranged to receive the FIM identifier as an input from the modified FIM module 102 and interpret the modified FIM identifier directly. In this way the FIE control module 106 uses the FIM identifier and calculates the appropriate fuel injection pulse sequence for the engine, operating the nozzle control valve 50 and rail control valve 26 appropriately.

This differs from the apparatus shown in FIG. 1 in which the FIE control module 76 interprets the FIM identifier passed to it by the FIM module 72 by referring to the look up table 78.

The skilled reader will appreciate that various modifications may be made to the embodiment described above without departing from the inventive concept, as defined by the claims. For example, although it is preferred that the FIM identifier takes the form of a hexadecimal number for processing by the engine control unit 70, it will be appreciated that this is for mainly for convenience of electronic processing and that other number bases are also appropriate.

Furthermore, although the invention has been described in relation to a hybrid fuel injection system, it should be noted that the invention is not limited in such a way and has utility in any fuel injection system in which it is possible to inject an injection pulse sequence, in which each pulse in the sequence may take on one of several different types or characteristics.

The invention claimed is:

1. A fuel injection apparatus comprising:
a fuel injection arrangement for delivering a fuel injection pulse sequence to a combustion chamber during a combustion cycle, the fuel injection pulse sequence comprising a plurality of discrete fuel injection pulses, each discrete fuel injection pulse having a fuel injection pulse type;
a calculation module for monitoring a plurality of vehicle operating parameters, calculating a fuel injection mode in response thereto, and determining a fuel injection mode identifier; and
a controller arranged to receive the fuel injection mode identifier from the calculation module and operate the fuel injection arrangement in response thereto;
wherein the fuel injection mode identifier comprises a plurality of markers, each of the plurality of markers having an ordinal number and a value, wherein the ordinal number of each marker is indicative of the sequential position of an associated one of the plurality of the discrete fuel injection pulses within the fuel injection pulse sequence, and the value of each marker is indicative of the fuel injection pulse type of said associated one of the plurality of discrete fuel injection pulses.

2. The fuel injection apparatus of claim 1, wherein the fuel injection mode identifier comprises a hexadecimal string.

3. The fuel injection apparatus of claim 1, wherein each of the plurality of fuel injection pulse types is associated with a different fuel metering method.

4. The fuel injection apparatus of claim 3, wherein each of the plurality of fuel injection pulse types include selected ones from the group of: i) disabled injection pulse; ii) common rail pressure injection pulse; iii) unit pump pressure injection pulse; iv) unit pump pressure with spill-end injection pulse v) common rail pressure HCCI injection pulse.

5. The fuel injection apparatus of claim 4, wherein the common rail pressure HCCI injection pulse includes a plurality of sub-pulses.

6. The fuel injection apparatus of claim 1, wherein the plurality of discrete fuel injection pulses includes one or more pilot injection pulses, one or more main injection pulses and one or more post injection pulses.

7. The fuel injection apparatus of claim 1, wherein the apparatus is a hybrid fuel injection system including a unit pump arrangement configured to supply pressurised fuel at a first pressure level to a fuel injector and to a fuel accumulator volume and which pump arrangement is adapted to increase the pressure of fuel from at the first pressure level to a second, increased pressure level for supply to the fuel injector.

8. A method of encoding a fuel injection mode in a fuel injection apparatus including an engine control unit and an injection controller, the method including
determining a sequence of fuel injection pulses
determining a fuel injection pulse type for each pulse in the sequence
determining a fuel injection mode identifier that is indicative of the sequence and which is interpretable by the injection controller, wherein the fuel injection mode identifier comprises a plurality of markers, each of the plurality of markers having an ordinal number and a value, and wherein the ordinal number of each marker is indicative of the sequential position of an associated one of the plurality of the discrete fuel injection pulses within the fuel injection pulse sequence, and the value of each marker is indicative of the fuel injection pulse type of said associated one of the plurality of discrete fuel injection pulses.

9. The method of claim 8, wherein the fuel injection mode identifier comprises a hexadecimal string.

10. The method of claim 8, wherein each of the plurality of fuel injection pulse types is associated with a different fuel metering method.

11. The method of claim 10, wherein the plurality of fuel injection pulse types include selected ones from the group of: i) disabled injection pulse; ii) common rail pressure injection pulse; iii) unit pump pressure injection pulse; iv) unit pump pressure with spill-end injection pulse v) common rail pressure HCCI injection pulse.

12. The method of claim 11, wherein the common rail pressure HCCI injection pulse includes a plurality of sub-pulses.

13. The method of claim 8, wherein the plurality of discrete fuel injection pulses includes one or more pilot injection pulses, one or more main injection pulses and one or more post injection pulses.

* * * * *